United States Patent
Munakata et al.

(10) Patent No.: US 6,710,842 B2
(45) Date of Patent: Mar. 23, 2004

(54) CHIRAL SMECTIC LIQUID CRYSTAL DEVICE

(75) Inventors: Hirohide Munakata, Yokohama (JP); Naoya Nishida, Chigasaki (JP); Yasufumi Asao, Atsugi (JP); Koji Noguchi, Sagamihara (JP); Ryuichiro Isobe, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 09/824,822

(22) Filed: Apr. 4, 2001

(65) Prior Publication Data

US 2002/0015130 A1 Feb. 7, 2002

(30) Foreign Application Priority Data

Apr. 7, 2000 (JP) .................................. 2000-106383

(51) Int. Cl.[7] .............................................. G02F 1/141
(52) U.S. Cl. ........................ 349/172; 349/184; 438/1.1
(58) Field of Search ......................... 349/172, 33, 76, 349/168, 184; 428/1.1

(56) References Cited

U.S. PATENT DOCUMENTS

| | | | |
|---|---|---|---|
| 5,686,020 A | 11/1997 | Nohira et al. | 252/299.61 |
| 5,709,818 A | 1/1998 | Yamashita et al. | 252/299.61 |
| 5,709,819 A | 1/1998 | Yamashita et al. | 252/299.61 |
| 5,710,433 A | 1/1998 | Yamashita et al. | 252/299.61 |
| 5,744,059 A | 4/1998 | Yamashita et al. | 252/299.61 |
| 5,785,890 A | 7/1998 | Yamashita et al. | 252/299.62 |
| 5,830,386 A | 11/1998 | Nohira et al. | 252/299.61 |
| 5,863,458 A | 1/1999 | Miyara et al. | 252/299.01 |
| 5,885,482 A | 3/1999 | Asaoka et al. | 252/299.01 |
| 5,932,136 A | 8/1999 | Terada et al. | 252/299.01 |
| 6,083,574 A | 7/2000 | Asao et al. | 428/1.1 |
| 6,122,031 A | 9/2000 | Terada et al. | 349/155 |
| 6,128,064 A | 10/2000 | Moriyama et al. | 349/173 |
| 6,195,147 B1 * | 2/2001 | Asao et al. | 349/133 |
| 6,221,444 B1 | 4/2001 | Okada et al. | 428/1.25 |
| 6,420,000 B1 * | 7/2002 | Nakamura et al. | 428/1.1 |

FOREIGN PATENT DOCUMENTS

| | | | |
|---|---|---|---|
| JP | 63-228130 | 9/1988 | |
| JP | 200338464 | * 6/1999 | G02F/1/133 |
| JP | 200010076 | 1/2000 | |
| JP | 2000 338464 | 12/2000 | |

OTHER PUBLICATIONS

Japan Display '86, Clarks, et al., "Structures and Application of SSFLC Devices" (1986), pp. 456–458.
Japanese Journal of Applied Physics, Miyasato, et al., "Direct Method with Triangular Waves for Measuring . . . ", vol. 22, No. 10 (1993), pp. L661–L663.
Japanese Journal of Applied Physics, Ouchi, et al., "Smectic C*· Chevron Layer Structure Studied by X-ray Diffraction", vol. 27, No. 5 (1988), pp. L725–L728.
Applied Physics Letter, Schadt, et al., "Voltage–Dependent Optical Activity . . . " vol. 18, No. 4 (1971), pp. 127–128.

* cited by examiner

Primary Examiner—Toan Ton
Assistant Examiner—P. R. Akkapeddi
(74) Attorney, Agent, or Firm—Fitzpatrick, Cella, Harper & Scinto (57) ABSTRACT

A chiral smectic liquid crystal device includes chiral smectic liquid crystal exhibiting a phase transition series on temperature decrease of (a) Iso, Ch and SmC* or (b) Iso and SmC*, a pair of oppositely disposed substrates which sandwich the liquid crystal to form a plurality of pixels, each substrate provided with an electrode for applying a voltage to the liquid crystal and a uniaxial alignment axis for aligning the liquid crystal, and means for providing a difference in potential between the substrates of at least 100 mV when no external electric field is applied in a temperature range of Tc±2° C. where Tc denotes a phase transition temperature from Ch to SmC* or from Iso to SmC. At least one substrate is provided with a polarizer, and each pixel is provided with an active element connected to an associated electrode on at least one substrate.

7 Claims, 4 Drawing Sheets

CHIRAL SMECTIC LIQUID CRYSTAL DEVICE

BACKGROUND OF THE INVENTION

The present invention relates to a chiral smectic liquid crystal device for use in light-valves for flat-panel displays, projection displays, printers, etc., and liquid crystal apparatus using the liquid crystal device or a display panel.

As a type of nematic liquid crystal display device used heretofore, there has been known an active matrix-type liquid crystal device, wherein each pixel is provided with an active element (e.g., a thin film transistor (TFT)).

As a nematic liquid crystal material used for such an active matrix-type liquid crystal device using a TFT, twisted nematic (TN) liquid crystal, as disclosed by M. Schadt and W. Helfrich, Appl. Phys. Lett., vol. 18, no.4, pp. 127–128 (1971), has been widely used.

In recent years, there has been proposed a liquid crystal device of In-Plane Switching mode utilizing an electric field applied in a longitudinal direction of the device or of Vertical Alignment mode, thus improving a viewing angle characteristic which is poor in conventional liquid crystal displays.

Accordingly, there are various liquid crystal modes suitable for the TFT-type liquid crystal device using nematic liquid crystal material. In any mode, however, the resultant nematic liquid crystal display device has encountered a problematically slow response speed of several ten milliseconds or more.

In order to improve the response characteristic of conventional types of nematic liquid crystal devices, several liquid crystal devices using a specific chiral smectic liquid crystal, such as a ferroelectric liquid crystal of a short pitch-type, a polymer-stabilized ferroelectric liquid crystal or an anti-ferroelectric liquid crystal showing no threshold (voltage) value have been proposed. Although these devices have not been put into practical use sufficiently, it has been reported that a high speed responsiveness on the order of below millisecond is realized.

With respect to the chiral smectic liquid crystal device, our research group has proposed a liquid crystal device as in U.S. patent application Ser. No. 09/338,426 (filed Jun. 23, 1999) (corresponding to Japanese Laid-Open Patent Application (JP-A) 2000-338464) or JP-A 2000-010076 wherein a chiral smectic liquid crystal has a phase transition series on temperature decrease of isotropic liquid phase (Iso)—cholesteric phase (Ch)—chiral smectic C phase (SmC*) or Iso-SmC* and liquid crystal molecules are monostabilized at a position inside an edge of or at an edge position of a virtual cone. During the phase transition of Ch-SmC* or Iso-SmC*, liquid crystal molecular layers are uniformly oriented or aligned in one direction, e.g., by applying a DC voltage of one polarity (+ or -) between a pair of substrates to improve high speed responsiveness and gradation control performance and realize a high luminance liquid crystal device excellent in motion picture image qualities with a high mass productivity. The liquid crystal device of this type may advantageously be used in combination with active elements such as a TFT because the liquid crystal material used has a relatively small spontaneous polarization compared with those used in the conventional chiral smectic liquid crystal devices. The liquid crystal device described in JP-A 2000-010076 can realize a stable gradational (halftone) display with less hysteresis.

As described above, in a sense of solving the problem of conventional nematic liquid crystal devices, i.e., improvement in response speed, the realization of a practical liquid crystal device using a chiral smectic liquid crystal, particularly a monostabilized liquid crystal device as proposed by our research group, is expected for use in advanced displays with high speed responsiveness and good gradation display performance in combination.

In the above-mentioned monostabilized liquid crystal device, however, in order to provide liquid crystal molecules with a uniform layer (formation) direction during an (initial) alignment stage after the liquid crystal is injected into a cell, the liquid crystal has been required to be subjected to a DC voltage application treatment.

As a result, for production of the liquid crystal device, an additional step of cooling the liquid crystal device while applying a DC voltage is required. Further, when the liquid crystal used in the liquid crystal device is once placed in the cholesteric phase under a condition free from application of an external electric field, it is necessary to effect again the DC application treatment. Accordingly, the liquid crystal device is substantially accompanied with a problem such that an upper storage temperature of the liquid crystal device is at most a phase transition temperature (Tc) from Ch (or Iso) to SmC*.

In order to solve the problem, it may be considered that a difference in surface potential is given between a pair of substrates by, e.g., changing a material and/or film structure of opposing surface portions of the pair of substrates, in order to apply a steady-state DC electric field to the liquid crystal.

However, when application of such a steady-state DC electric field is continued in an operational temperature of the liquid crystal device, the liquid crystal device shows an asymmetrical driving characteristic which causes image memory (sticking) phenomenon at the time of long-term drive.

SUMMARY OF THE INVENTION

A principal object of the present invention is to provide a chiral smectic liquid crystal device which solves the above-mentioned problems.

A specific object of the present invention is to provide a chiral smectic liquid crystal device free, from an upper limit storage temperature capable of reproducing an alignment state with uniform smectic layer (formation) direction through a cooling operation under no external electric field application even when once placed in cholesteric (or isotropic) phase by ensuring a potential difference between a pair of substrates sufficient to provide a uniform smectic layer (formation) direction in the vicinity of Tc (Ch(or Iso)-SmC* phase transition temperature) under no external electric field application state and a smaller potential difference between the substrates sufficient not to cause driving characteristic deterioration due to image memory etc. in an operation temperature.

Another object of the present invention is to provide a liquid crystal apparatus using the chiral smectic liquid crystal device in combination with drive means for driving the chiral smectic liquid crystal device.

According to the present invention, there is provided a chiral smectic liquid crystal device comprising: a chiral smectic liquid crystal exhibiting a phase transition series on temperature decrease of (a) isotropic liquid phase (Iso), cholesteric phase (Ch) and chiral smectic C phase (SmC*) or (b) isotropic phase (Iso) and chiral smectic C phase (SmC*), and a pair of substrates each provided with an electrode for applying a voltage to the liquid crystal and a uniaxial alignment axis for aligning the liquid crystal, at least one of the substrates being provided with a polarizer and the pair of substrates being oppositely disposed to sandwich the liquid crystal so as to form a plurality of pixels each provided with an active element connected to an associated electrode on at least one of the substrates, wherein the liquid crystal device further includes means for providing a difference in potential between the pair of substrates of at least 100 mV under a condition free from application of an external electric field in a temperature range of Tc±2° C. where Tc denotes a phase transition temperature from Ch to SmC* or from Iso to SmC*. Below 100 mV, the resultant layer direction is likely to not be uniform.

In the liquid crystal device, the means may preferably provide a difference in potential between the substrates of at most 100 mV at least in a temperature range of 10–50° C. under a condition free from application of an external electric field. Above 100 mV, the image memory due to (asymmetrical) DC bias application is likely to result.

In the above-described cases, the difference in potential in the temperature range of Tc±2° C. may preferably be 150 mV to 3 V so as to provide a further uniform layer direction.

In the liquid crystal device of the present invention, the above-mentioned means may preferably comprise a film formed of at least one material providing a difference in potential between the substrates of at least 150 mV at least in a temperature range of 10–75° C., more preferably 10–50° C., when provided to at least one of the opposing surfaces of the pair of substrates.

According to the present invention, there is also provided a liquid crystal apparatus comprising: a liquid crystal device according to anyone of the above-mentioned liquid crystal devices and drive means for driving the liquid crystal device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the present invention will be described more specifically.

The present invention has been accomplished by directing our attention to a high-resistive material providing a surface potential difference of at least 150 mV depending on a temperature change from 20° C. to 70° C.

In the chiral smectic liquid crystal device according to the present invention, under a condition free from no external electric field application, a difference in surface potential between a pair of substrates of at least 100 mV is ensured by surface potential-imparting means, whereby even when a temperature of the liquid crystal device is increased up to at least the Ch(or Iso)-SmC* phase transition temperature (Tc), an alignment with a uniform layer formation direction of smectic liquid crystal molecules at the Tc or below is reproduced, thus obviating an upper limit storage temperature (corresponding to the Tc) of the liquid crystal device. In the liquid crystal device, the potential difference between the substrates in an operation temperature range is reduced, thus suppressing a deterioration in property, such as an occurrence of image memory.

In the present invention, by optimizing the potential difference between the pair of substrates so as to be large enough to provide a uniform layer direction (of liquid crystal molecules) in the vicinity of the Tc and small enough not to cause a deterioration in driving characteristic in an operation temperature (actual drive temperature) of the liquid crystal device even when the liquid crystal device temperature is increased up to a Ch(or Iso) phase temperature under no external electric field application, it becomes possible to reproduce an alignment state with a uniform (aligned) smectic layer (formation) direction by cooling under application of no external electric field. As a result, the resultant liquid crystal device is free from the upper limit storage temperature and less likely to cause drive characteristic deterioration due to continuous application of a DC component.

In the present invention, in order to control the potential difference between the pair of substrates, temperature (dependence) characteristics of the alignment film, potential adjusting layer underlying the alignment film and a substrate for the pair of substrates are appropriately controlled singly or in combination.

In a preferred embodiment, the above-described liquid crystal device is driven for displaying (color) images in a succession of frame periods (per one second) each in which an alignment state of the chiral smectic liquid crystal used is appropriately changed with time.

The chiral smectic liquid crystal used in the present invention is placed in a monostabilized state under no external electric field application as described above.

The resultant chiral smectic liquid crystal device may be those described in the above-mentioned JP-A 2000-338464 and JP-A 2000-010076, wherein a chiral smectic liquid crystal has a phase transition series on temperature decrease of isotropic liquid phase (Iso)—cholesteric phase (Ch)—chiral smectic C phase (SmC*) or Iso-SmC* and liquid crystal molecules are monostabilized at a position inside an edge of or at an edge position of a virtual cone, thus realizing an alignment state in SmC* with no memory state.

The chiral smectic liquid crystal used in the present invention, as described above, has a phase transition series on temperature decrease of Iso-Ch-SmC* or Iso-SmC*, thus lacking smectic A phase (SmA) (which is generally confirmed in ordinary chiral smectic liquid crystal materials).

The chiral smectic liquid crystal may preferably be a liquid crystal composition prepared by appropriately blending a plurality of liquid crystal materials, e.g., selected from hydrocarbon-type liquid crystal materials containing a biphenyl, phenyl-cyclohexane ester or phenyl-pyrimidine skeleton, naphthalene-type liquid crystal materials, and fluorine-containing liquid crystal materials.

The liquid crystal composition as the chiral smectic liquid crystal used in the liquid crystal device may preferably comprise at least two compounds, each represented by the following formulae (1), (2), (3) and (4).

Formula 1 wherein A is $R_1$ and $R_2$ are independently a linear or branched alkyl group having 1–20 carbon atoms optionally having a substituent; $X_1$ and $X_2$ are independently a single bond O, COO or OOC; $Y_1$, $Y_2$, $Y_3$ and $Y_4$ are independently H or F; and n is 0 or 1.

Formula (2)

wherein A is $R_1$ and $R_2$ are independently a linear or branched alkyl group having 1–20 carbon atoms optionally having a substituent; $X_1$ and $X_2$ are independently a single bond O, COO or OOC; and $Y_1$, $Y_2$, $Y_3$ and $Y_4$ are independently H or F.

Formula (3)

wherein A

-continued or $R_1$ and $R_2$ are independently a linear or branched alkyl group having 1–20 carbon atoms optionally having a substituent; $X_1$ and $X_2$ are independently a single bond O, COO or OOC; and $Y_1$, $Y_2$, $Y_3$ and $Y_4$ are independently H or F.

Formula (4)

wherein $R_1$ and $R_2$ are independently a linear or branched alkyl group having 1–20 carbon atoms optionally having a substituent; $X_1$ and $X_2$ are independently a single bond, O, COO or OOC; and $Y_1$, $Y_2$, $Y_3$ and $Y_4$ are independently H or F.

Hereinbelow, an embodiment of the liquid crystal device according to the present invention will be described with reference to FIG. 1.

Figure 1:
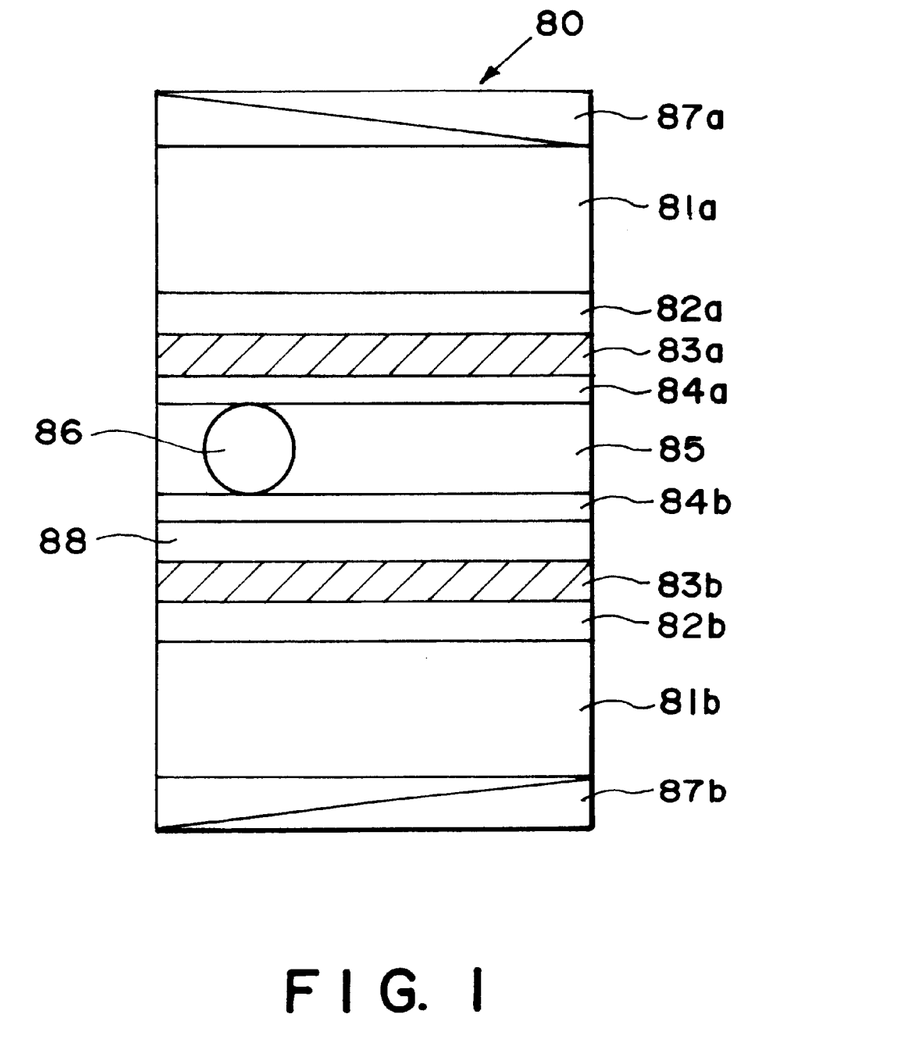
FIG. 1 is a schematic sectional view of an embodiment of the liquid crystal device according to the present invention.

FIG. 1 shows a schematic sectional view of a liquid crystal device 80 according to the present invention.

Referring to FIG. 1, the liquid crystal device 80 includes a pair of substrates 81a and 81b; electrodes 82a and 82b disposed on the substrates 81a and 81b, respectively; insulating films 83a and 83b disposed on the electrodes 81a and 82b, respectively; a surface potential adjusting film 88 disposed on the insulating film 83b; alignment control films 84a and 84b disposed on the insulating film 83a and the surface potential adjusting film 88, respectively; a chiral smectic liquid crystal 85 disposed between the alignment control films 84a and 84b; a spacer 86 disposed together with the liquid crystal 85 between the alignment control films 84a and 84b; and a pair of cross-nicol polarizers 87a and 87b (with crossed polarizing axes at right angles) sandwiching the pair of substrates 81a and 81b.

Each of the substrates 81a and 81b comprises a transparent material, such as glass or plastic, and is coated with, e.g., plurality of stripe electrodes 82a (82b) of $In_2O_3$ or ITO (indium tin oxide) for applying a voltage to the liquid crystal 85. These electrodes 82a and 82b are arranged in a (dot-) matrix form. In a preferred embodiment, as described later, one of the substrates 81a and 81b is provided with a matrix electrode structure wherein dot-shaped transparent electrodes are disposed as pixel electrodes in a matrix form and each of the pixel electrodes is connected to a switching or active element, such as a TFT (thin film transistor) or MIM (metal-insulator-metal), and the other substrate may be provided with a counter (common) electrode on its entire surface or in a prescribed pattern, thus constituting an active matrix-type liquid crystal device.

On the electrodes 82a and 82b, the insulating films 83a and 83b, e.g., of $SiO_2$, $TiO_2$ or $Ta_2O_5$ having a function of preventing short circuit may be disposed, respectively, as desired.

In this embodiment, on the insulating film 13b, the surface potential adjusting film 88 (for adjusting the potential difference between the substrates 81a and 81b) is formed as an underlying layer for the alignment control film 14b. The surface potential adjusting film 88 may be formed on both of insulating films 13a and 13b.

As the surface potential adjusting film 88, it is possible use as a principal component (insulating matrix material) a film having a lower dispersion term of a surface energy than a material for the alignment control film 84a (84b) of, e.g., polyamide or polyimide. Specifically, it is possible to use a film of a ladder type polysiloxane or an organic compound-modified silica.

The surface potential adjusting film 88 may preferably have a volume resistivity of $1.0 \times 10^4$–$1.0 \times 10^{10}$ ohm.cm.

As the potential difference adjusting film 88 it is possible to use a film comprising an insulating matrix (binder) and fine particles (electroconductive fine particles dispersed therein so as to more appropriately control the above-mentioned electrical properties such as volume resistivity and surface potential. Examples thereof may include films, preferably coating-type films, comprising a matrix of SiOx, TiOx, ZrOx, another meltable inorganic oxide, and a polymer, such as siloxane polymer, and fine particles dispersed therein of oxides, inclusive of group II element oxides, such as ZnO, CdO and ZnCdOx, group IV element oxides, such as $GeO_2$, $SnO_2$, GeSnOx, $TiO_2$, $ZrO_2$ and TiZrOx, and group IV semiconductors, such as Si and SiC, so as to control the film property and the resistivity of the film.

Examples of the electroconductivity-controlling impurities added to the fine particles may include: n-type impurities (donor: impurities enhancing electron-conductivity) comprising group III elements, such as B, Al, Ga and In, and p-type impurities (acceptors: impurities enhancing hole-conductivity) comprising group I elements, such as Cu, Ag, Au and Li, respectively, for the group II element oxides; and n-type impurities comprising group V elements, such as P, As, Sb and Bi, and p-type impurities comprising group III elements, such as B, Al, Ga and In, respectively, for the group IV element oxides or semiconductors.

As a consideration for adding such an impurity in the potential difference adjusting film, a donor is added when the substrate having the potential difference adjusting film has a positive surface potential, and an acceptor is added when it has a negative surface potential. The concentration of the impurity can vary depending on the kind of material (the fine particles, a combination of impurities) and crystal state (density of crystal defect), but may preferably be determined so as to provide a free electron or free hole concentration of ca. $1.0 \times 10^{11}$–$1.0 \times 10^{14}$ atm/$cm^3$.

When using a polycrystalline or amorphous material as the insulating matrix material, the impurity maybe actually added in an amount of preferably $1.0 \times 10^{17}$–$10 \times 10^{20}$ atm/$cm^3$ (ca. 0.01–1% of the matrix material) while taking the addition efficiency of the impurity into consideration.

On the insulating film 83a and the potential adjusting film 88 the alignment control films 14a and 14b are disposed so as to control the alignment state of the liquid crystal 15 contacting the alignment control films 84a and 84b. At least one (preferably both) of the alignment control films 84a and 84b are subjected to uniaxial aligning treatment (e.g., rubbing). Such an alignment control film 84a (84b) may be prepared by forming a film of an organic material (such as polyimide, polyimideamide, polyamide or polyvinyl alcohol through wet coating with a solvent, followed by drying and rubbing in a prescribed direction or by forming a deposited film of an inorganic material through an oblique vapor deposition such that an oxide (e.g., SiO) or a nitride is vapor-deposited onto a substrate in an oblique direction with a prescribed angle to the substrate).

The alignment control films 84a and 84b may appropriately be controlled to provide liquid crystal molecules of the above-mentioned liquid crystal 85 disposed therebetween with a prescribed pretilt angle α (an angle formed between the liquid crystal molecule and the alignment control film surface at the boundaries with the alignment control films) by changing the material and treating conditions (of the uniaxial aligning treatment).

In the case where both of the alignment control films 84a and 84b are subjected to the uniaxial aligning treatment (rubbing), the respective uniaxial aligning treatment (rubbing) directions may appropriately be set in an anti-parallel relationship, a parallel relationship or a crossed relationship.

The substrates 81a and 81b are disposed opposite to each other via the spacer 86 comprising e.g., silica beads for determining a distance (i.e., cell gap) therebetween, preferably in the range of 0.3–10 μm, in order to provide a uniform uniaxial aligning performance and such an alignment state that an average molecular axis of the liquid crystal molecules under no electric field application is substantially aligned with an average uniaxial aligning treatment axis or a bisector of two uniaxial aligning treatment axes) although the cell gap varies its optimum range and its upper limit depending on the liquid crystal material used.

In addition to the spacer 86, it is also possible to disperse adhesive particles of a resin (e.g., epoxy resin) (not shown) between the substrates 81a and 81b in order to improve adhesiveness therebetween and an impact (shock) resistance of the chiral smectic liquid crystal.

A liquid crystal device having the above-mentioned liquid crystal cell structure can be prepared using a chiral smectic liquid crystal material 85 while adjusting the composition thereof, and further by appropriate adjustment of the liquid crystal material treatment, the device structure including a material, and a treatment condition for alignment control films 84a and 84b. As a result, in a preferred embodiment of the present invention, the liquid crystal material may preferably be placed in an alignment state such that the liquid crystal molecules are aligned to provide an average molecular axis to be monostabilized in the absence of an electric field applied thereto and, under application of voltages of one polarity (a first polarity), are tilted in one direction from the average molecular axis under no electric field to provide a tilting angle which varies continuously from the average molecular axis of the monostabilized position depending on the magnitude of the applied voltage. On the other hand, under application of voltages of the other polarity (i.e., a second polarity opposite to the first polarity), the liquid crystal molecules are tilted in the other direction from the average molecular axis under no electric field depending on the magnitude of the applied voltages, thus realizing a halftone (gradation) display. Further, in this embodiment a maximum tilting angle β1 obtained under application of the first polarity voltages based on the monostabilized position is substantially larger than a maximum tilting angle β2 formed under application of the second polarity voltages, i.e., β1>β2. Further, β2 may be substantially zero degrees, i.e., the average molecular axis is not moved substantially under application of the second polarity voltages.

The liquid crystal device of the present invention may be used as a color liquid crystal device by providing one of the pair of substrates 81a and 81b with a color filter comprising color filter segments (color portions) of at least red (R), green (G) and blue (B). It is also possible to effect a full color display by successively switching (lighting) a light source comprising R light source, G light source and B light source emitting color light fluxes to effect color mixing in a time division (sequential) manner.

The liquid crystal device of the present invention is of a light-transmission type such that the pair of substrates 81a and 81b are sandwiched between a pair of polarizers to optically modulate incident light (e.g., issued from an external light source) through one of the substrates to be passed through the other substrate. The liquid crystal device of the present invention may be modified into a reflection-type liquid crystal device by providing a reflection plate to either one of the substrates 81a and 81b or using a combination of one of the substrates per se formed of a reflective material or with a reflecting member thereon and the other substrate provided with a polarizer outside thereof, thus optically modulating incident light and reflected light and causing the reflected light to pass through the substrate on the light incident side.

In the present invention, by using the above-mentioned liquid crystal device in combination with a drive circuit for supplying gradation signals to the liquid crystal device, it is possible to provide a liquid crystal display apparatus capable of effecting a gradational display based on the above-mentioned alignment characteristic such that under voltage application, a resultant tilting angle varies continuously from the monostabilized position of the average molecular axis (of liquid crystal molecules) and a corresponding emitting light quantity continuously changes, depending on the applied voltage. For example, it is possible to use, as one of the pair of substrates, an active matrix substrate provided with a plurality of switching elements (e.g., TFT (thin film transistor) or MIM (metal-insulator-metal)) in combination with a drive circuit (drive means), thus effecting an active matrix drive based on amplitude modulation to allow a gradational display in an analog gradation manner.

Hereinbelow, an embodiment of a liquid crystal display apparatus including a liquid crystal device of the present invention provided with such an active matrix substrate will be explained with reference to FIGS. 2–4.

Figure 2:
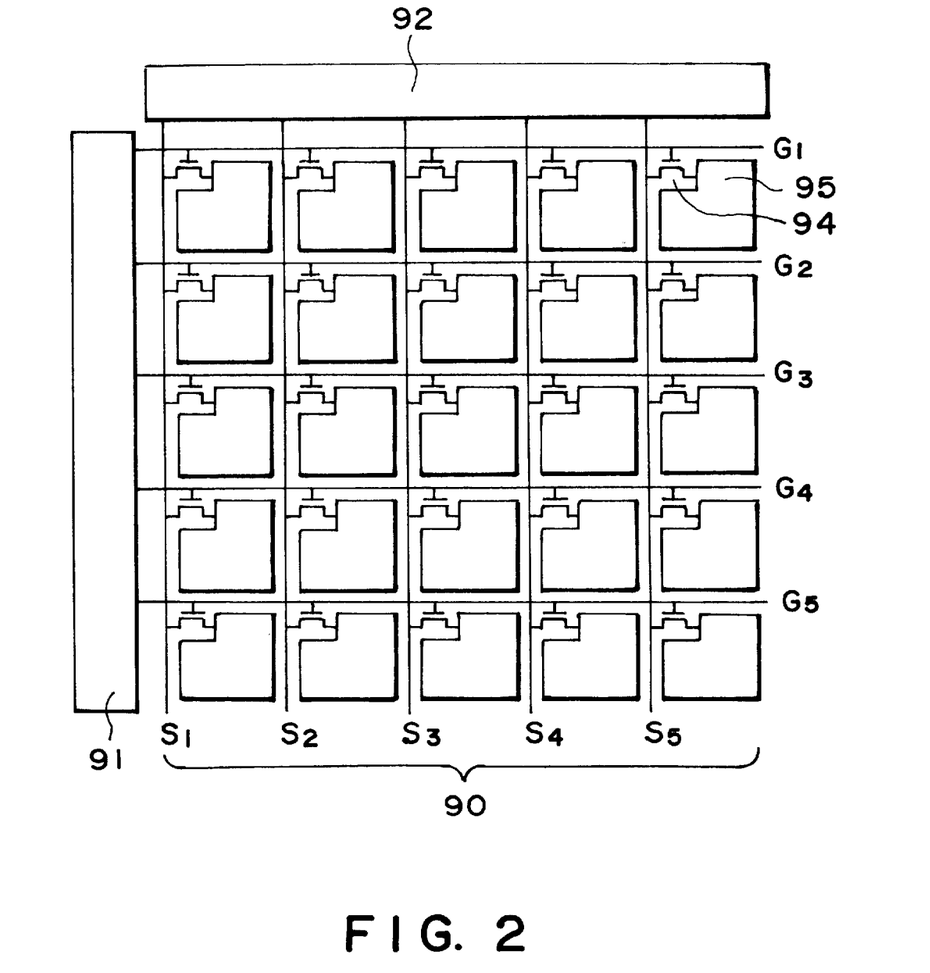
FIG. 2 is a schematic plan view of an active matrix substrate of the liquid crystal device of the present invention connected with drive means (circuits).

FIG. 2 shows a schematic plan view of such a display apparatus including a liquid crystal device and a drive circuit (means) and principally illustrates a structure on the active matrix substrate side.

Referring to FIG. 2, a liquid crystal device (panel) 90 includes a structure such that scanning signal lines (gate lines) (G1, G2, G3, G4, G5, . . . ) connected to a scanning signal driver 91 (drive means) and data signal lines (source lines) (S1, S2, S3, S4, S5, . . . ) connected to a data signal driver 92 (drive means) are disposed to intersect each other at right angles in an electrically isolated state, thus forming a plurality of pixels (5×5 in FIG. 2) each at the intersection thereof. Each pixel is provided with a thin film transistor (TFT) 94 as a switching element and a pixel electrode 95. The scanning signal (gate) lines (G1, G2, . . . ) are connected with gate electrodes (not shown) of the TFT 94, respectively, and the data signal (source) lines (S1, S2, . . . ) are connected with source electrodes (not shown) of the TFT 94, respectively. The pixel electrodes 95 are connected with drain electrodes (not shown) of the TFT 94, respectively.

A gate voltage is supplied to the gate lines (G1, G2, . . . ) from the scanning signal driver 91 by effecting scanning selection in, e.g., a line-sequential manner. In synchronism with this scanning selection on the gate lines 96, the source lines (S1, S2, . . . ) are supplied with a data signal voltage depending on writing data for each pixel from the data signal driver 92. The thus-supplied gate and data signal voltages are applied to each pixel electrode 95 via the TFT 94.

Figure 3:
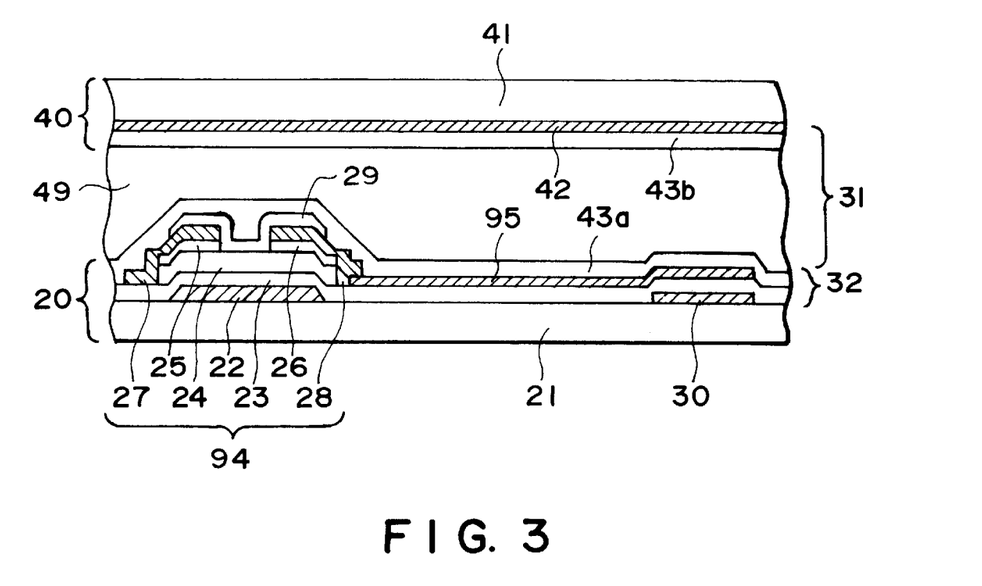
FIG. 3 is a schematic sectional view of a one-pixel portion of the liquid crystal device shown in FIG. 2.

FIG. 3 shows a sectional structure of each pixel portion (corresponding to 1 bit) in the panel structure shown in FIG. 2.

Referring to FIG. 3, a chiral smectic liquid crystal layer 49 is sandwiched between an active matrix substrate or plate 20 provided with a TFT 94 and a pixel electrode 95 and an opposing substrate or plate 40 provided with a common electrode 42, thus providing a liquid crystal capacitor (Clc) 31 of the liquid crystal layer 49.

In this embodiment, the active matrix substrate 20 includes an amorphous silicon (a-Si) TFT as the TFT 94. The TFT maybe of a polycrystalline-Si (p-Si) type.

The TFT 94 is formed on a substrate 21 of, e.g., glass, and includes a gate electrode 22 connected with the gate lines (G1, G2, . . . shown in FIG. 2), an insulating film (gate insulating film) 23 of, e.g., silicon nitride (SiNx) formed on the gate electrode 22, an a-Si layer 24 formed on the insulating film 23, $n^+$ a-Si layers 25 and 26 formed on the a-Si layer 24 and spaced apart from each other, a source electrode 27 formed on the $n^+$ a-Si layer 25, a drain electrode 28 formed on the $n^+$ a-8i layer 26 and spaced apart from the source electrode 27, a channel protective film 29 partially covering the a-Si layer 24 and the source and drain electrodes 27 and 28. The source electrode 27 is connected with the source lines (S1, S2, . . . shown in FIG. 2), and the drain electrode 28 is connected with the pixel electrode 95 (FIG. 2) of a transparent conductor film (e.g., ITO film). The TFT 94 is placed in an "ON" state by applying a gate pulse to the gate electrode 22 during a scanning selection period of the corresponding gate line.

Further, on the active matrix substrate 20, a structure constituting a holding or storage capacitor, (Cs) 32 is formed by the pixel electrode 95, a storage capacitor electrode 30 disposed on the substrate 21, and a portion of the insulating film 23 sandwiched therebetween. The structure (storage capacitor) (Cs) 32 is disposed in parallel with the liquid crystal capacitor 31. In the case where the storage capacitor electrode 30 has a large area, a resultant aperture or opening rate is decreased. In such a case, the storage capacitor electrode 30 is formed of a transparent conductor film (e.g., ITO film).

On the TFT 94 and the pixel electrode 95 of the active matrix substrate 20, an alignment film 43a provided with a uniaxial alignment axis by, e.g., rubbing for controlling an alignment state of the liquid crystal 49, is formed.

On the other hand, the opposing substrate 40 includes a substrate (e.g., glass substrate) 41, a common electrode 42 having a uniform thickness disposed on the entire substrate 41, and an alignment film 43b having a uniform thickness, disposed on the common electrode 42, for controlling an alignment state of the liquid crystal 49.

The above liquid crystal device shown in FIG. 3 is sandwiched between a pair of cross-nicol polarizers (not shown) (provided with polarizing axes disposed perpendicular to each other) to constitute a light-transmission type liquid crystal device.

Next, an example of an ordinary active matrix driving method utilizing the liquid crystal device having the active matrix substrate (plate) and the above-mentioned cell structure will be described with reference to FIGS. 4 and 5 in combination with FIGS. 2 and 3.

Figure 4:
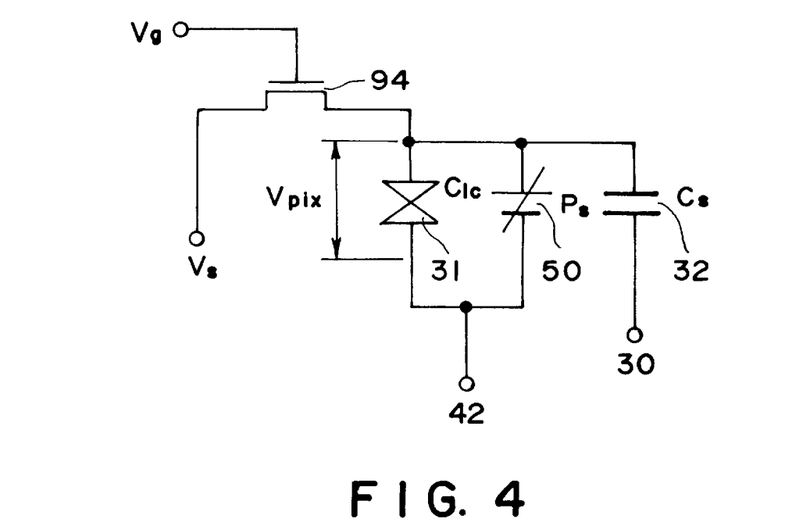
FIG. 4 is an equivalent circuit of the one-pixel portion shown in FIG. 3.

FIG. 4 shows an example of an equivalent circuit for each pixel portion of such a liquid crystal device as shown in FIG. 3.

Figure 5:
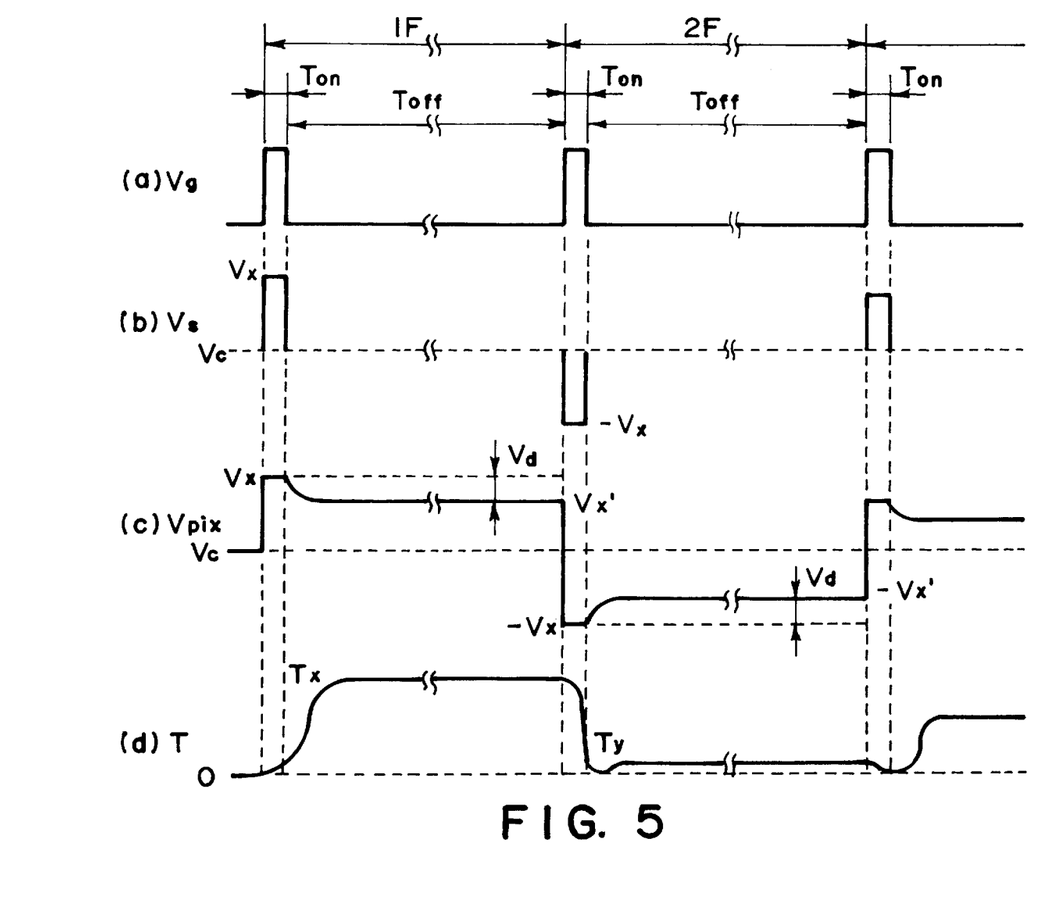
FIG. 5 is a time chart of driving waveforms for the liquid crystal device shown in FIGS. 2–4.

In the active matrix driving method used in the present invention described below, as shown in FIG. 5, for each pixel, one frame period for displaying a prescribed data is divided into a plurality of field periods (e.g., 1F and 2F in FIG. 5) each for a prescribed image.

In each of the field periods 1F and 2F, a prescribed transmitted light quantity depending on a prescribed image data for each field period is obtained. Further, in each frame period, an average of the transmitted light quantities in the field periods 1F and 2F is obtained to provide a prescribed image.

Hereinbelow, an active matrix driving method using a frame period divided into two field periods and a liquid crystal material 49 having an alignment characteristic such that liquid crystal molecules are aligned or oriented to provide sufficient transmitted light quantities under application of one polarity voltage and weaker transmitted light quantities under application of the other polarity voltage will be described.

FIG. 5 shows at (a) a voltage waveform applied to one gate line (e.g., G1 shown in FIG. 2) (as a scanning signal line) connected with each pixel.

In the liquid crystal device driven by the active matrix driving method, the gate lines G1, G2, ... shown in FIG. 2 are selected in a line-sequential manner in each of the field periods 1F and 2F. At this time, each gate electrode 22 connected with a corresponding gate line is supplied with a prescribed gate voltage Vg in a selection period $T_{on}$ of each field period (e.g., 1F), thus placing the TFT 94 in an "ON" state. In a non-selection period $T_{off}$ (of, e.g., the field period 1F) corresponding to a period in which other gate lines are selected, the gate electrode 22 is not supplied with the gate voltage Vg, thus placing the TFT 94 in an "OFF" state (high-resistance state). In every selection period $T_{on}$, a prescribed and same gate line is selected and a corresponding gate electrode 22 is supplied with the gate voltage Vg.

FIG. 5 shows at (b) a voltage waveform applied to one source line (e.g., S1 shown in FIG. 2) (as a data signal line) connected to the pixel concerned.

When the gate electrode 22 is supplied with the gate voltage Vg in the selection period $T_{on}$ of each field period 1F or 2F as shown at (a) of FIG. 5, in synchronism with this voltage application, a prescribed source voltage (data signal voltage) Vs having a prescribed potential providing a writing data (pulse) to the pixel concerned is applied to a source electrode 27 through the source line connected with the pixel based on a potential Vc of a common electrode 42 as a reference potential.

More specifically, in the first field period 1F constituting one frame period, a positive polarity source voltage Vs having a potential Vx (based on a reference potential Vc) providing a desired optical state or display data (transmittance) based on a voltage-transmittance (V-T) characteristic for the liquid crystal used is applied to the source electrode 27 concerned.

At this time, the TFT 94 is in an "ON" state, whereby the positive-polarity source voltage Vx applied to the source electrode 27 is supplied to a pixel electrode 95 via a drain electrode 28, thus charging a liquid crystal capacitor.(Clc) 31 and a storage capacitor (Cs) 32. As a result, the potential of the pixel electrode 95 becomes a level equal to that of the positive-polarity source (data signal) voltage Vx.

Then, in a subsequent non-selection period $T_{off}$ for the gate line on the pixel concerned, the TFT 94 is in an "OFF" (high-resistance) state. At this time (in $T_{off}$ of 1F), in the liquid crystal cell, the liquid crystal capacitor (Clc) 31 and the storage capacitor (Cs) 32 retain the electric charges therein, respectively, charged in the selection period $T_{on}$ to keep the (positive-polarity) voltage Vx. As a result, the liquid crystal layer 49 of the pixel concerned is supplied with the voltage Vx through the first field period 1F to provide thereat a desired optical state (transmitted light quantity) depending on the voltage Vx.

In the case where the response time of the liquid crystal is larger than the gate "ON" period, a switching of the liquid crystal is effected in the non-selection period $T_{off}$ (the gate "OFF" period) after the completion of the charging of the liquid crystal capacitor (Clc) 31 and the storage capacitor (Cs) 32. In this case, the electrical charges stored in the capacitors are reduced due to inversion of spontaneous polarization 50 to provide (positive-polarity) voltage Vx' smaller than the voltage Vx by a voltage Vd as a pixel voltage Vpix applied to the liquid crystal layer 49 as shown at (c) of FIG. 5.

Thereafter, in the second (subsequent) field period 2F, a negative polarity source voltage Vs (=−Vx) having an identical potential (absolute value) to but a polarity opposite to the source voltage Vs (=Vx) applied in the first field period 1F is applied to the source electrode 27 concerned.

At this time, the TFT 84 is in an "ON" state, whereby the negative polarity source voltage−Vx is supplied to a pixel electrode 95, thus charging a liquid crystal capacitor (Clc) 31 and a storage capacitor (Cs) 32. As a result, the potential of the pixel electrode 95 becomes a level equal to that of the negative polarity source (data signal) voltage−Vx.

Then, in a subsequent non-selection period $T_{off}$, for the gate line on the pixel concerned, the TFT 94 is in an "OFF" (high resistance) state. At this time (in $T_{off}$ of 2F), in the liquid crystal cell, the liquid crystal capacitor (Clc) 31 and the holding capacitor (Cs) 32 retain the electric charges therein, respectively, charged in the selection period $T_{on}$ to keep the (negative polarity) voltage−Vx. As a result, the liquid crystal layer 49 of the pixel concerned is supplied with the voltage−Vx through the second field period 2F to provide thereat a desired optical state (transmitted light quantity) depending on the voltage−Vx.

In the case where the response time of the liquid crystal is larger than the gate "ON" period, a switching of the liquid crystal is effected in the non-selection period $T_{off}$ (the gate "OFF" period) after the completion of the charging of the liquid crystal capacitor (Clc) 32 and the storage capacitor (Cs) 32. In this case, similarly as in the first period 1F, the electrical charges stored in the capacitors are reduced due to inversion of spontaneous polarization 50 to provide (negative polarity) voltage−Vx' smaller than the voltage−Vx by a voltage Vd as a pixel voltage Vpix applied to the liquid crystal layer 49 as shown at (c) of FIG. 5.

FIG. 5 shows at (d) an example of an actual optical response at the pixel concerned.

As shown at (c) of FIG. 5, an applied voltage through two field periods 1F and 2F comprises the positive polarity voltage Vx' in the first field period 1F and the negative polarity voltage−Vx' (having the same amplitude (absolute value) as Vx') in the second field period 2F. In the first field period 1F, as shown at (d) of FIG. 5, a higher luminance or transmitted light quantity Tx is obtained in the first field period 1F, but in the second field period 2F, a lower luminance or transmitted liquid quantity Ty, which is closer to zero but a non-zero value because the relationship of β1>β2 is satisfied, is obtained.

As described above, in the active matrix driving method, it becomes possible to effect a good gradational display based on a high speed responsiveness of the chiral smectic liquid crystal. In addition, a gradational display of a prescribed level at each pixel is continuously performed by dividing one frame period into a first field pixel 1F providing a higher transmitted light quantity and a second field period 2F providing a lower transmitted light quantity, thus resulting in a timewise aperture rate of at most 50% to improve a human-sensible high speed responsiveness with respect to motion picture display. Further, in the second field period 2F providing the lower transmitted light quantity, the resultant transmitted light quantity is not completely zero due to a slight switching (inversion) performance of liquid crystal molecules, thus ensuring a certain human-sensible luminance through the entire frame period.

In the above embodiment, the polarity of the voltage (Vx or −Vx) is changed alternately for every field period (1F or 2F) (i.e., polarity inversion for each field period), whereby the voltage actually applied to the liquid crystal layer 49 is continuously changed in an alternating manner to suppress a deterioration of the liquid crystal material used even in a continuous display operation for a long period.

As described above, in the above active matrix driving method, in each frame period consisting of two field periods 1F and 2F, a resultant transmitted light quantity corresponds to an average of Tx and Ty. Accordingly, in order to obtain a further higher transmitted light quantity in each frame period, it is preferred to apply a source (data signal) voltage Vs providing a transmitted light quantity higher than Tx in the first field period 1F by a prescribed level.

The liquid crystal device of the present invention may be applicable to a full color liquid crystal display apparatus using the liquid crystal device in combination with a plurality of color light sources of at least red (R), green (G) and blue (B) without using a color filter, as desired, thus effecting color mixing in a time-division multiplexing manner.

Hereinbelow, the present invention will be described more specifically based on examples.

EXAMPLE 1

A chiral smectic liquid crystal composition LC-1 was prepared by mixing the following compounds in the indicated proportions.

| Structural Formula | wt. % |
|---|---|
|  | 11.55 |
|  | 11.55 |
|  | 7.70 |
|  | 7.70 |
|  | 7.70 |
|  | 9.90 |
|  | 9.90 |
|  | 30.0 |

-continued

| Structural Formula | wt. % |
|---|---|
| $C_{10}H_{21}$—[pyridine]—[phenyl]—$OCH_2\overset{*}{C}HC_8H_{17}$ (with F substituent) | 4.00 |

The thus-prepared liquid crystal composition LC-1 showed the following phase transition series and physical properties.

Phase Transition Temperature (° C.)

$$\text{Iso} \xrightarrow{86.3} \text{Ch} \xrightarrow{61.2} \text{Smc*} \xrightarrow{-7.2} \text{Cry}$$

(Iso: isotropic phase, Ch: cholesteric phase, SmC*: chiral smectic C phase, Cry: crystal phase)

Spontaneous polarization (Ps): 2.9 nC/cm$^2$(30° C.)

Tilt angle: Ĥ: 23.3 degrees (30° C.), AC voltage=100 Hz and ±12.5 V, cell gap=1.4 μm)

Layer inclination angle δ: 21.6 degrees (30° C.)

Helical pitch (SmC*): at least 20 μm (30° C.)

The values of spontaneous polarization Ps, tilt angle Ĥ, and layer inclination angle δ in the smectic layer referred to herein are based on values measured according to the following methods.

Measurement of Spontaneous Polarization Ps

The spontaneous polarization Ps was measured according to "Direct Method with Triangular Waves for Measuring Spontaneous Polarization in Ferroelectric Liquid Crystal", as described by K. Miyasato et al., Japan. J. Appl. Phys., vol. 22, no. 10, pp. L661+ (1983).

Measurement of Tilt Angle Ĥ

A liquid crystal device was sandwiched between right angle cross-nicol polarizers and rotated horizontally relative to the polarizers under application of an AC voltage of ±12.5 V to ±50 V and 1 to 100 Hz between the upper and lower substrates of the device while measuring a transmittance through the device by a photomultiplier (available from Hamamatsu Photonics K.K.) to find a first extinct position (a position providing the lowest transmittance) and a second extinct position. A tilt angle Ĥ was measured as half of the angle between the first and second extinct positions.

Measurement of Liquid Crystal Layer Inclination Angle δ

The method used was basically similar to the method used by Clark and Largerwal, Japanese Display '86, Sep. 30–Oct. 2, 1986, pp. 456–458, or the method of Ohuchi et al., J.J.A.P., vol. 27, no. 5, pp. 725–728 (1988). The measurement was performed using a rotary cathode-type x-ray diffraction apparatus (available from MAC Science), and 80 μm-thick microsheets (available from Corning Glass Works) were used as the substrates so as to minimize the x-ray absorption with the glass substrates of the liquid crystal cells.

A blank cell was prepared in the following manner.

A pair of 1.1 mm-thick glass substrates, each provided with a 700 Å-thick transparent electrode of ITO film, was provided; one of the pair of glass substrates was formed in an active matrix substrate provided with a plurality of a-Si TFTs and a silicone nitride (gate insulating) film, and the other glass substrate (counter substrate) was provided with a color filter including color filter segments of red (R), green (G) and blue (B).

The thus-prepared blank cell (active matrix cell) having a structure had a picture area size of 10.4 inches including a multiplicity of pixels (800×600×RGB).

On the above-prepared active matrix substrate, a solution of nylon 66 (available from Toray K.K.) in formic acid was spin-coated, followed by hot-drying at 180° C. for 1 hour to form a nylon film having a thickness of 500 Å.

On the counter substrate, a dispersion of 2 wt. % silicon oxide (comprising an SiOx polymer containing 40 wt. % ladder-type polysiloxane) in which 3 wt. % SnOx fine particles (average diameter=ca. 100 Å) in a mixture solvent (ethanol/hexyleneglycoU/methyl ethyl ketone=55/40/5) was spin-coated, followed by hot-baking at 200° C. for 1 hour to form a silicon oxide (SnOx)-based film having a thickness of 2000 Å.

On the thus-prepared SnOx-based film, a solution of nylon in formic acid (identical to one used for forming the nylon film of the active matrix substrate) was spin-coated, followed by hot-drying at 180° C. for 1 hour to form a nylon film having a thickness of 50 Å.

Each of the thus-obtained nylon films was subjected to rubbing treatment (as a uniaxial aligning treatment) with a nylon cloth under the following conditions to provide an alignment control film.

Rubbing roller: 85 mm diameter roller about which a nylon cloth ("NF-77", mfd. by Teijin K.K.) was wound Pressing depth: 0.35 mm Substrate feed rate: 20 cm/sec Rotation speed: 1000 rpm Substrate feed: 1 time Then, on one of the substrates, silica beads (average particle size=1.5 μm) were dispersed, and, on the other substrate, adhesive particles of epoxy resin (average particle size=ca. 5 μm) were dispersed. The thus-treated pair of substrates were applied to each other with a sealing agent (epoxy resin) so that the rubbing treating axes were in parallel with each other but oppositely directed (anti-parallel relationship), followed by baking for curing to prepare a blank cell with a uniform cell gap.

The liquid crystal composition LC-1 was injected into the above-prepared blank cell in its cholesteric phase state and gradually cooled to a temperature providing chiral smectic C phase to prepare a liquid crystal device (panel) A.

EXAMPLE 2

A liquid crystal device B was prepared in the same manner as in Example 1 except that the thickness of the nylon film (50 Å) for the counter substrate was changed to 100 Å.

Comparative Example 1

A liquid crystal device C was prepared in the same manner as in Example 1 except that the SnOx-based, film (2000 Å) and the nylon film (50 Å) for the counter substrate was changed to a 500 Å-thick nylon film (which was prepared in the same manner as in the case of the active matrix substrate).

Comparative Example 2

A liquid crystal device D was prepared in the same manner as in Example 1 except that the SnOx-based film (2000 Å) and the nylon film (50 Å) for the counter substrate was changed to a 100 Å-thick nylon film (which was prepared in the same manner as in the case of the active matrix substrate).

Each of the above-prepared four liquid crystal devices A, B, C and D (with respect to their blank cells before the liquid crystal injection) were subjected to measurement of potential difference (between the active substrate and the counter substrate) at Tc (Ch-SmC* phase transition temperature: 61.2° C.) and 30° C. using a potential difference measurement apparatus (Model "R64521A", mfd. by Advantest Co.).

Further, each of the liquid crystal devices A, B, C and D were evaluated as to a proportion of layer (formation) direction at 30° C. and image memory in the following manner.

Layer Direction

The liquid crystal device was sandwiched between a pair of cross-nicol polarizers so that the polarizing axis was aligned with a layer direction (of liquid crystal molecules) providing the darkest (black) state. If there was a region in which liquid crystal molecules were directed in another layer direction, escape of light ocurred in the region, thus providing a white state.

The layer direction was evaluated as a proportion (%) (areal ratio) of the black state region per the entire region.

Image Memory

Two electrode areas were disposed adjacent to and connected to a test cell, and one electrode area was energized and the other electrode was not energized (left standing). After a prescribed time, the two electrodes areas were supplied with a voltage (for providing a halftone state). At that time, when a difference in luminace between the two electrode areas was confirmed by visual observation, the test cell was evaluated such that the image memory occurred in the cell.

The results are shown in Table 1.

On the other hand, although liquid crystal device C (potential difference of 20 mV) showed an excellent image memory-prevention performance due to its symmetrical film structure, liquid crystal device C showed a smaller proportion of layer direction (60%) leading to a poor colorant.

Liquid crystal device D (potential difference of 70 mV) showed a smaller proportion of layer direction (70%) and a poor image-memory prevention performance.

As described hereinabove, according to the present invention, even if a liquid crystal device is once placed in a cholesteric (or isotropic) phase state during a storage thereof, the liquid crystal device is caused to have a uniform smectic layer (formation) direction due to a sufficient potential difference (at least 100 mV) when returned to chiral smectic phase state. As a result, the liquid crystal device of the present invention is free from its upper limit storage temperature. Further, the liquid crystal device shows a smaller potential difference (at most 100 mV) at an operation temperature (e.g., at 30° C.), thus preventing continuous application of a DC voltage component leading to the image memory phenomenon.

The liquid crystal device is combined with a drive means to provide a liquid crystal apparatus excellent in driving and display performances.

What is claimed is:

1. A chiral smectic liquid crystal device comprising:

a chiral smectic liquid crystal exhibiting a phase transition series on temperature decrease, wherein said phase transition series is (a) isotropic liquid phase (Iso), cholesteric phase (Ch) and chiral smectic C phase (SmC*) or (b) isotropic phase (Iso) and chiral smectic C phase (SmC*), and a pair of substrates each provided with an electrode for applying a voltage to the liquid crystal and a uniaxial alignment axis for aligning the liquid crystal, at least one of the substrates being provided with a polarizer and the pair of substrates being oppositely disposed to sandwich the liquid crystal so as to form a plurality of pixels each provided with an active element connected to an associated electrode on at least one of the substrates, wherein the liquid crystal device further includes means for providing a difference in potential between the pair

TABLE 1

| Example No. | Film structure for active matrix substrate | counter substrate | Potential difference at Tc | at 30° C. | Layer direction proportion (30° C.) (%) | Image memory (30° C.) |
|---|---|---|---|---|---|---|
| Ex. 1 | Nylon (500 Å) | SnOx-based (200 Å) and nylon (50 Å) | 150 mV | 20 mV | 99% | Not occurred for 100 hr |
| Ex. 2 | " | SnOx-based (200 Å) and nylon (100 Å) | 110 mV | 50 mV | 95% | Not occurred for 100 hr |
| Comp. Ex. 1 | " | Nylon (500 Å) | 20 mV | 20 mV | 60% | Not occurred for 100 hr |
| Comp. Ex. 2 | " | Nylon (100 Å) | 70 mV | 150 mV | 70% | Occurred after 30 hr |

As apparent from Table 1, liquid crystal devices A and B providing a potential difference of at least 100 mV at Tc (according to the present invention) showed a very high proportion of layer direction (99% and 95%) and an excellent image memory-prevention performance.

of substrates of at least 100 mV under a condition free from application of an external electric field in a temperature range of Tc±2° C. where Tc denotes a phase transition temperature from Ch to SmC* or from Iso to SmC*.

2. The device according to claim 1, wherein said means provides a difference in potential between the substrates of at most 100 mV at least in a temperature range of 10–50° C. under a condition free from application of an external electric field.

3. The device according to claim 1, wherein said difference in potential in the temperature range of Tc±2° C. is 150 mV to 3 V.

4. The device according to claim 3, wherein said means provides a difference in potential between the substrates of at most 100 mV at least in a temperature range of 10–50° C. under a condition free from application of an external electric field.

5. The device according to claim 1, wherein said means comprises a film formed of at least one material providing a difference in potential between the substrates of at least 150 mV at least in a temperature range of 10–75° C. when provided to at least one of opposing surfaces of the pair of substrates.

6. The device according to claim 5, wherein said temperature range is 10–50° C.

7. A liquid crystal apparatus comprising:
   a liquid crystal device according to any one of claims 1–6, and drive means for driving the liquid crystal device.

* * * * *

UNITED STATES PATENT AND TRADEMARK OFFICE
CERTIFICATE OF CORRECTION

PATENT NO. : 6,710,842 B2
DATED : March 23, 2004
INVENTOR(S) : Munakata et al.

It is certified that error appears in the above-identified patent and that said Letters Patent is hereby corrected as shown below:

Title page,
Item [56], References Cited, FOREIGN PATENT DOCUMENTS, should read:
"JP 200338464 * 6/1999..........G02F/1/133" should be deleted. Also OTHER PUBLICATIONS, Under Japanese Journal of Applied Physics, Ouchi et al., " C̶x̶ " should read -- C* --.

Column 15,

Line 23, "Ĥ:" should read --Ⓗ:--.

Line 27, "Ĥ," should read --Ⓗ,--.

Lines 37 and 46, "Ĥ" should read --Ⓗ--.

Signed and Sealed this

Fourth Day of January, 2005

JON W. DUDAS
*Director of the United States Patent and Trademark Office*